US 6,629,807 B2

(12) United States Patent
Bernardo

(10) Patent No.: US 6,629,807 B2
(45) Date of Patent: Oct. 7, 2003

(54) ADJUSTABLE TRUCK BED DIVIDER FOR STABILIZING CARGO

(75) Inventor: R. Gregory Bernardo, Pompano Beach, FL (US)

(73) Assignee: Roll-N-Lock, Pompano Beach, FL (US)

( * ) Notice: Subject to any disclaimer, the term of this patent is extended or adjusted under 35 U.S.C. 154(b) by 21 days.

(21) Appl. No.: 10/046,354

(22) Filed: Oct. 26, 2001

(65) Prior Publication Data

US 2003/0082023 A1 May 1, 2003

(51) Int. Cl.$^7$ ................................................ B60P 7/14
(52) U.S. Cl. ........................ 410/132; 410/118; 410/129; 410/130; 410/133; 410/141; 410/142
(58) Field of Search ................................ 410/118, 129, 410/130, 132, 133, 138, 139, 141, 142; 296/37.6, 24.1; 220/541, 542, 534, 544, 545, 546

(56) References Cited

U.S. PATENT DOCUMENTS

| 4,650,383 A | | 3/1987 | Hoff ............................ 410/149 |
| 4,722,646 A | * | 2/1988 | McIntyre ..................... 410/138 |
| 4,733,899 A | | 3/1988 | Keys |
| 4,772,165 A | | 9/1988 | Bartkus ....................... 410/139 |
| 4,917,429 A | | 4/1990 | Giger |
| 5,104,269 A | | 4/1992 | Hardison ..................... 410/149 |
| 5,251,950 A | | 10/1993 | Bernardo |
| 5,259,712 A | * | 11/1993 | Wayne ........................ 410/152 |
| 5,330,246 A | | 7/1994 | Bernardo |
| 5,350,213 A | | 9/1994 | Bernardo |
| 5,411,355 A | * | 5/1995 | Gosnell et al. .............. 410/139 |
| 5,427,486 A | * | 6/1995 | Green ......................... 410/118 |
| 5,586,850 A | * | 12/1996 | Johnson ...................... 410/138 |
| 5,800,145 A | * | 9/1998 | Kelce .......................... 410/142 |
| 6,039,521 A | * | 3/2000 | Sullivan ...................... 410/118 |
| 6,053,679 A | * | 4/2000 | Duffell ........................ 410/125 |
| 6,113,176 A | | 9/2000 | Bernardo |
| 6,206,624 B1 | * | 3/2001 | Brandenburg ............... 410/132 |

* cited by examiner

Primary Examiner—Stephen T. Gordon
(74) Attorney, Agent, or Firm—Malin, Haley & DiMaggio, P.A.

(57) ABSTRACT

A truck bed cargo barrier for use with a truck bed for stabilizing cargo items longitudinally and laterally. The cargo barrier is slidable relative to the front and back of the truck bed along a track system. The cargo barrier may be locked in a user specified position along the track system to accommodate the size of the load being carried forming a divider, or may be flipped up into a temporary storage position for linear cargo exceeding the length of the bed. Tie down brackets for bungee cords are adjustably attached to the barrier frame to secure cargo laterally. A barrier panel is connected to laterally adjustable, rigid side plates, each including two spaced apart wheels that ride on a pair of longitudinal tracks on the side walls of the truck bed. The spaced apart wheels firmly secure the barrier panel in a vertical position. A manual actuator permits manual positioning of the barrier panel along the bed frame front to back.

5 Claims, 7 Drawing Sheets

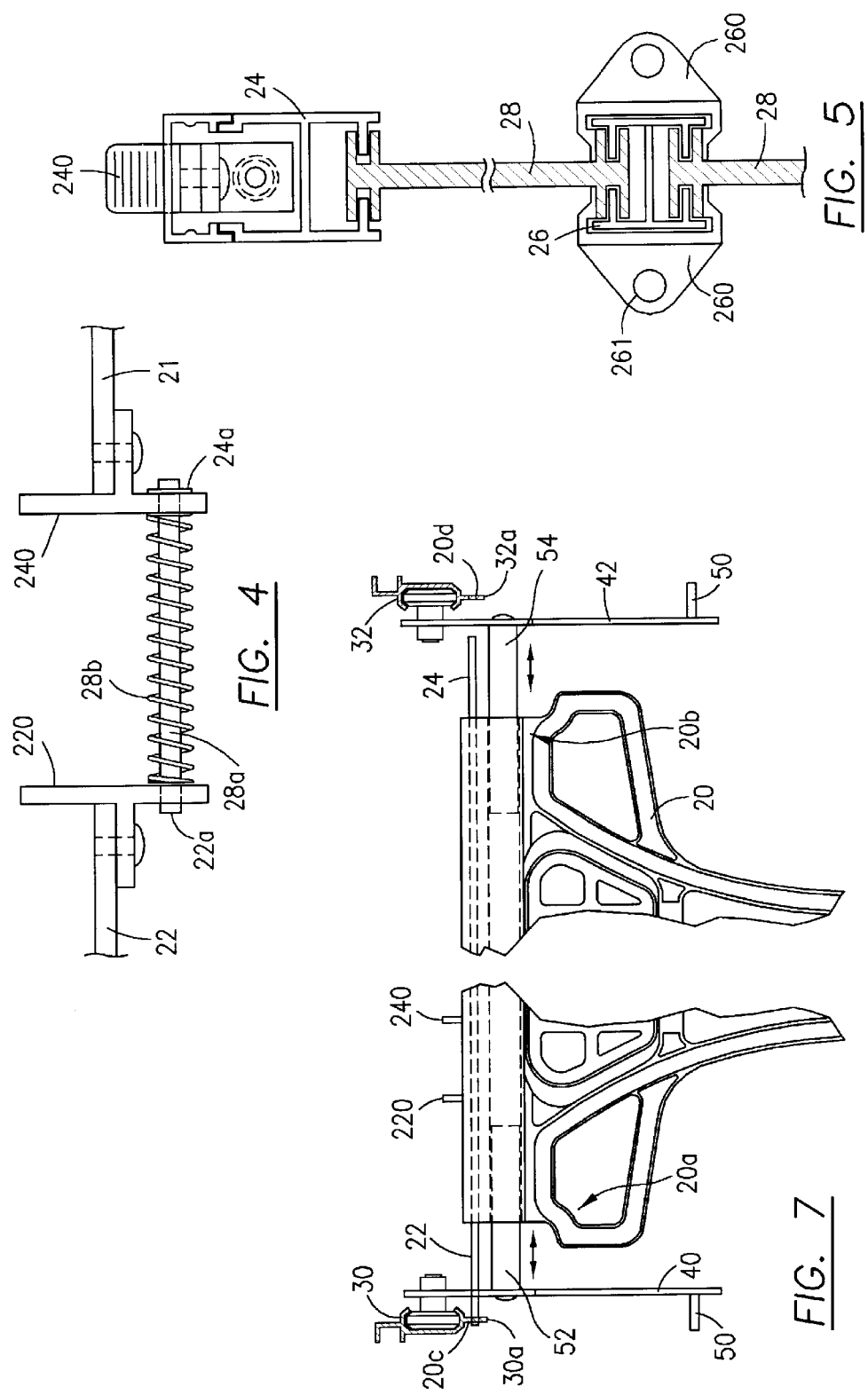

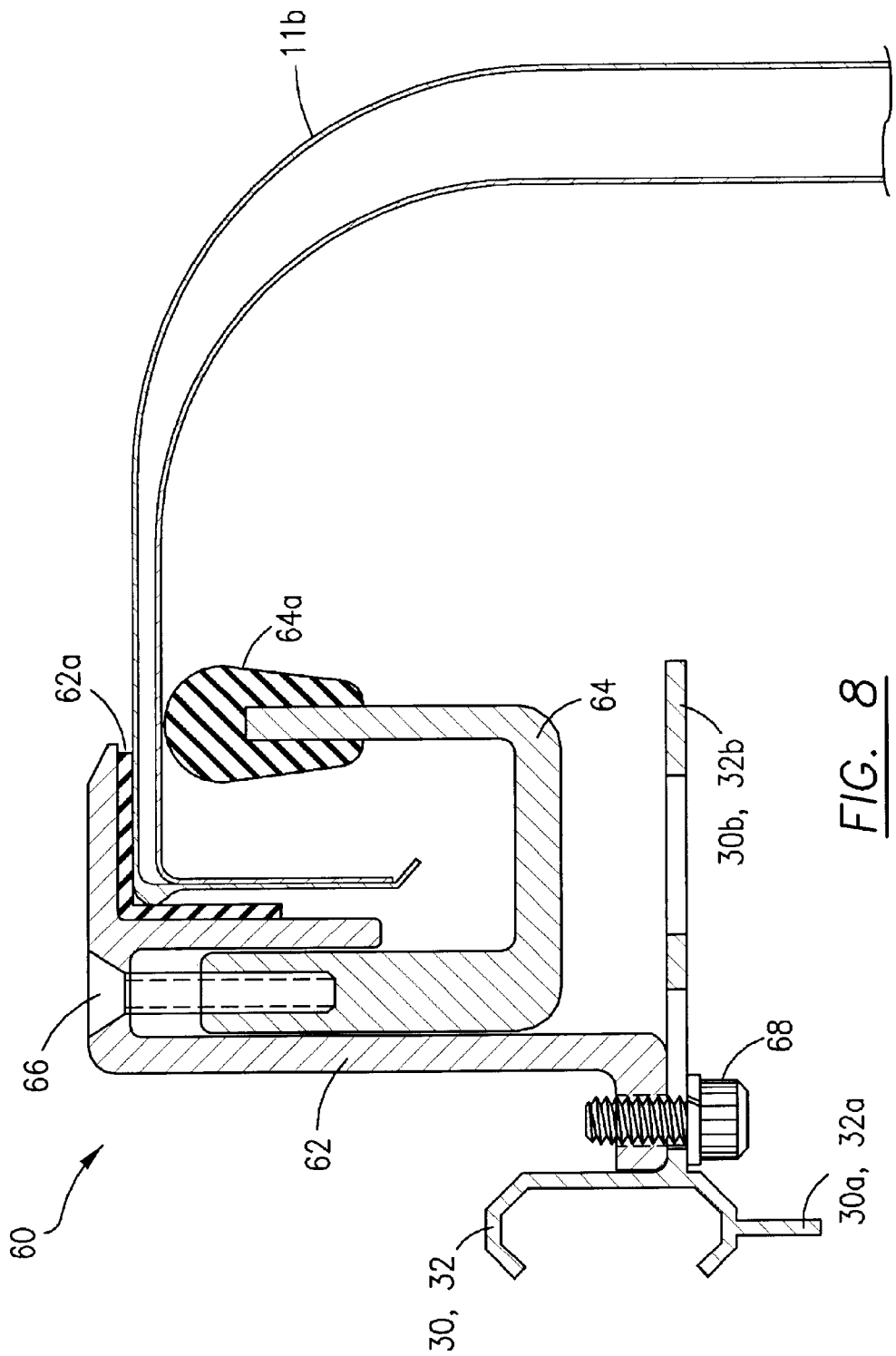

ADJUSTABLE TRUCK BED DIVIDER FOR STABILIZING CARGO

BACKGROUND OF THE INVENTION

1. Field of the Invention

This invention relates generally to an adjustable truck bed cargo organizer and divider and specifically to a manually adjustable, moveable truck bed cargo divider that is positionable along the length of the truck bed for securing in two directions individual cargo items.

2. Description of Related Art

A pick up truck typically has an open cargo bed. Unsecured cargo items or partial loads can move about the truck bed due to forces generated by turning, accelerating, stopping and riding over bumpy terrain. Truck bed dividers are used to secure partial loads in pickup trucks. Adjustable truck bed cargo dividers are known to secure and organize items placed within a truck bed in the longitudinal direction.

An adjustable truck bed cargo divider is generally comprised of a thin planar barrier secured to a truck bed forming an enclosed volume where one or more items may be secured by the cargo divider and the truck bed's adjoining side walls.

U.S. Pat. No. 5,427,486 issued to Green discloses an adjustable barrier device for securing a partial load in a load carrying area of a vehicle. The barrier uses spring-loaded elongated members that extend the width of the barrier and project outward of the barrier. The ends of the elongated members comprise friction pads for frictionally engaging the side walls of the load carrying area. These pads (and the barrier) may slide due to forces exerted by one or more cargo items being restrained during acceleration, braking, turning or riding over rough terrain.

U.S. Pat. No. 5,586,850 issued to Johnson discloses a panel suspended by singular wheels from tracks mounted along the side rails of the truck bed. A second track system is employed along the floor of the truck bed for panel stability. The top of the panel is secured into position by a sliding bolt. The panel is also secured by a sliding bolt that engages slots contained in the second track along the floor of the truck. The bottom track prevents the panel from pivoting about the axis of the opposing wheels. The track system on the floor of the truck bed is susceptible to dirt and debris clogging the tracks and therefore does not allow the transport of granular materials such as gravel and soil in the truck bed.

The present invention provides for an adjustable cargo divider system for use with a pickup truck bed that positively locks into place, is sturdy enough to hold cargo items securely in place, is easily moveable and adjustable to accommodate the size of the load being carried and allows the full or partial use of the truck bed, to stabilize cargo items in two dimensions, longitudinal and lateral.

BRIEF SUMMARY OF THE INVENTION

An adjustable truck bed cargo divider for use with cargo items transportation in a truck bed which includes a rigid, planar cargo barrier and a pair of rigid wheel carrier side plates, each plate slideably attached perpendicularly to each end of the barrier. Each wheel side plate has two wheels, spaced apart. The barrier width based on the distance between the opposing wheel carrier side plates may be varied to accommodate for different sized truck beds of varying widths by telescoping each wheel carrier side plate within the cargo barrier frame. A wheel receiving track is attached at the top of each longitudinal side of the truck bed, either by a bolt-on adaptation as an accessory to a retractable truck bed cover manufactured by Roll-N-Lock Corporation in specially provided mounting holes or by clamp-on members when adapting to an open truck bed or truck bed having an alternative bed cover such as a vinyl tonneau system. The wheel carrier side plates are slidably secured by their pairs of wheels to respective side tracks so that the cargo barrier is rigidly maintained in a vertical position within the truck bed.

The cargo barrier is maintained in a vertical position and prevented from pivoting by its attachment on each end to the wheel carrier side plates. The cargo barrier is elongated having a side plate attached at both ends so that the plane created by the cargo barrier is substantially perpendicular to the plane created by the side plates. The wheel carrier side plates are rigid, planar, and may be made of aluminum or other suitable material. The tops of the side plates extend lengthwise in relation to the tracks and are slidable along the tracks by the attachment of two separate wheels on each side plate for stability at either end of the top of each wheel carrier side plate. The side plates extend down in length on both sides of the cargo barrier and include a recess slot to receive an end portion of the barrier, thereby capturing and rigidly holding the cargo barrier which prevents the cargo barrier from pivoting due to forces which are exerted upon the cargo barrier by cargo items being restrained due to the truck braking, turning or riding over rough terrain. A triangular top support plate or gusset is horizontally engaged to the barrier and on top of one wheel carrier side plate. The gusset has a "unshaped" channel that engages the top surface of the barrier, extends forming a slidable channel which maintains the cargo barrier perpendicular to the side plate, preventing yawing as the barrier is moved along the tracks.

The cargo barrier is a flat, rigid, somewhat rectangular panel having a tubular peripheral frame that extends longer along the top of the panel.

Each wheel carrier side plate engages the barrier lateral top frame ends. Each plate has a perpendicular, rigid extension support arm that slides onto the top frame member of the barrier telescopically for lateral adjustment (different width beds), and is keyed (square extension arm and square panel slot) to prevent rotation of the wheel carrier side plate and the barrier frame.

Each side plate extends down from the wheel mount and includes a vertical recess sized to approximate the thickness of the barrier panel for snug engaging and stabilizing the barrier panel to each side plate. Note, however, each side plate can be moved laterally (telescopically) to adjust for different wheel track separations on different trucks.

Using a single barrier provides cargo security longitudinally along the truck bed, but does not address lateral or sideways movement of cargo. An important aspect of the invention is to secure individual cargo and individual items in two X/Y axes, longitudinally and laterally. In order to accomplish this, the barrier panel has a central lateral frame member that receives at least two slideable tie-off brackets that can engage stretchable bungee cords.

In use, the cargo barrier is manually adjustable longitudinally and can be locked in place relative to the front or back of the truck bed in numerous, specific positions. The manual actuator is conveniently located on one side of the barrier top frame member. The pair of tie-off brackets are slidably attached to the cargo barrier middle frame member to conveniently provide a hook receiving eye for the purpose of attaching a rope, cord or elastic cord. Cargo items restrained longitudinally by the cargo barrier are further restrained laterally using the rope, cord or elastic cords secured to the tie-off brackets by hooks or knots after the cord is wrapped around a cargo item.

When a cargo item is secured both longitudinally and laterally by the barrier and a tight (elastic) cord, vertical forces on the truck bed caused by bumps will not dislodge the cargo from the bed. Thus cargo is secured in three axes, i.e. x, y and z in Cartesian coordinates.

The cargo barrier is locked (mechanically engaged) in position by manually-actuated, spring-loaded positioning lock bars which project outward from each end of the cargo top frame barrier and are aligned with and engage selected receiving apertures located along the side tracks. Each track body has a plurality of receiving apertures to allow the cargo barrier to be locked in several different longitudinal positions along the tracks. The track body apertures are aligned from side to side of the truck bed so that two lock bars engage two opposing track apertures for security of the barrier when locked in place. Alternatively, the vertical barrier may be easily removed for convenience by disengaging and removing all wheels from within their respective wheel tracks.

On occasion, the vertical barrier may interfere with a unique or particular cargo item to be loaded into the bed. Therefore, vertical barrier may also be repositioned out of the way, if necessary, into a fixed, horizontal position. The user may disengage and remove two opposing wheels (one on each side plate) from within their respective wheel tracks and pivot the cargo barrier into a horizontal position about the axis created by the two remaining engaged wheels, allowing for convenient access beneath the pivoted barrier. An elongated cargo item such as a ladder may be placed in the cargo bed and not engage the barrier. The cargo barrier may be maintained in a horizontal position by pivot studs attached to each side plate which engage catch hooks along each track.

It is an object of this invention to provide an adjustable cargo divider for use with a truck bed that positively manually locks into place, secures individual cargo items in two and three dimensions, is easily manually moveable and adjustable to accommodate the size of the load being carried and allows the full or partial use of the truck bed in carrying a variety of loads such as packages, sport gear, work equipment, supplies and can be flipped up into a temporary, out of the way, storage position for unusually long cargo that exceeds the length of the bed.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 4 is a side elevational view of the manually activated clips attached to the lock bars of the invention, partially cut away.

FIG. 5 is a section partial cross end elevational view of the cargo barrier showing tie-off brackets attached to the barrier lateral beams.

FIG. 7 is a partially exploded front elevational view of the barrier assembly.

FIG. 8 is a front elevational view in cross section of a universal track mount for a conventional truck bed.

DETAILED DESCRIPTION OF THE INVENTION

Figure 1:
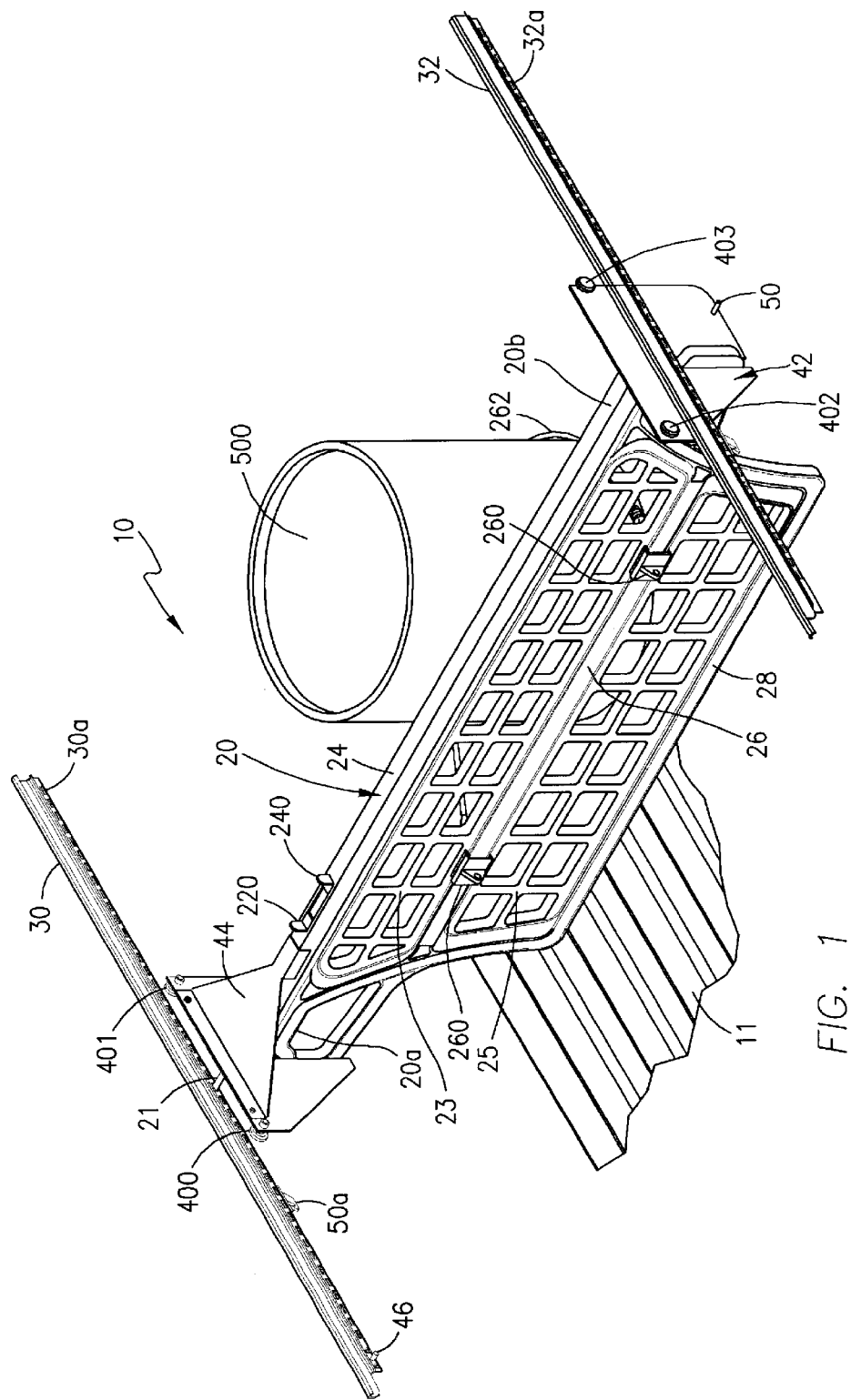
FIG. 1 is a partially exploded, perspective view of the invention.
Figure 9:
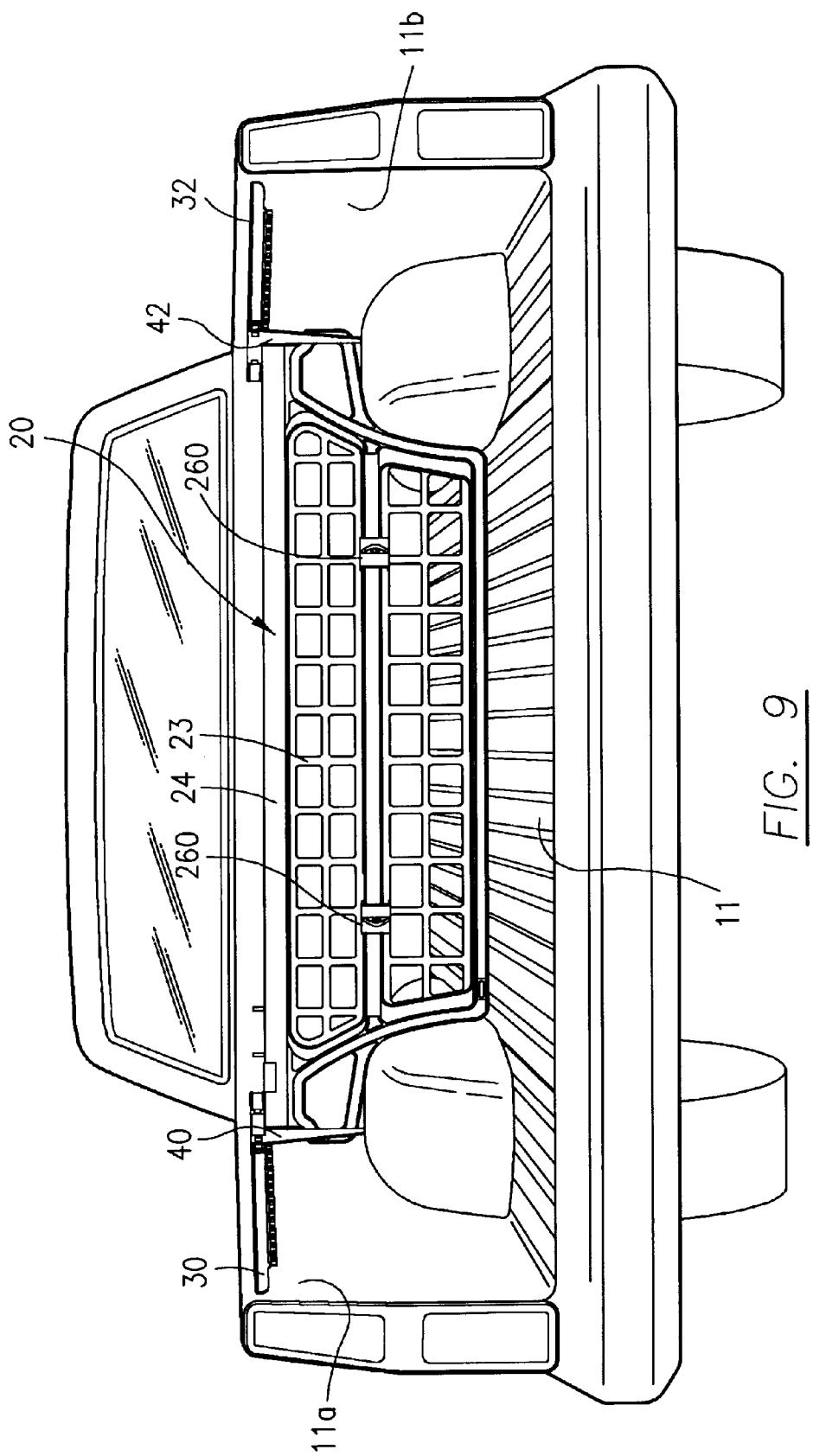
FIG. 9 is a perspective view of the invention installed within a truck bed.

Referring now to FIG. 1, the invention is shown as an adjustable cargo barrier system 10. The adjustable cargo system 10 basically comprises a cargo barrier 20 having a first end 20a and a second end 20b, a first track 30, a second track 32, a first wheel carrier side plate 40 and a second wheel carrier side plate 42. The cargo system 10 is installed within a truck bed (bed floor 11) having a first side wall 11a and opposing second side wall 11b as seen in FIG. 9.

The cargo barrier 20 is constructed of a top frame member 24, a bottom frame member 28 (that is shorter in length than top member 24), a middle frame member 26 and a pair of end arm members 600a and 600b (FIG. 3) joined to the top, middle and bottom lateral members. The overall shape of the barrier is trapezoidal, the upper frame 24 being longer than the bottom frame 28 to accommodate the inwardly extending fender wells in some truck beds. Two barrier grid interior panels (upper 23 and lower 25) are slideably installed when the barrier 20 is manufactured between the top frame 24 and bottom frame 28 members and the middle frame member 26 (as seen in FIG. 5). These panels 23 and 25 can be solid fabric or have an open grid pattern as shown in FIG. 1. The upper frame member 24 also houses the manual barrier longitudinal locking mechanism, described in detail below. The barrier side arms 600a and 600b fit snugly within each side plate recess for structural rigidity.

Figure 2:
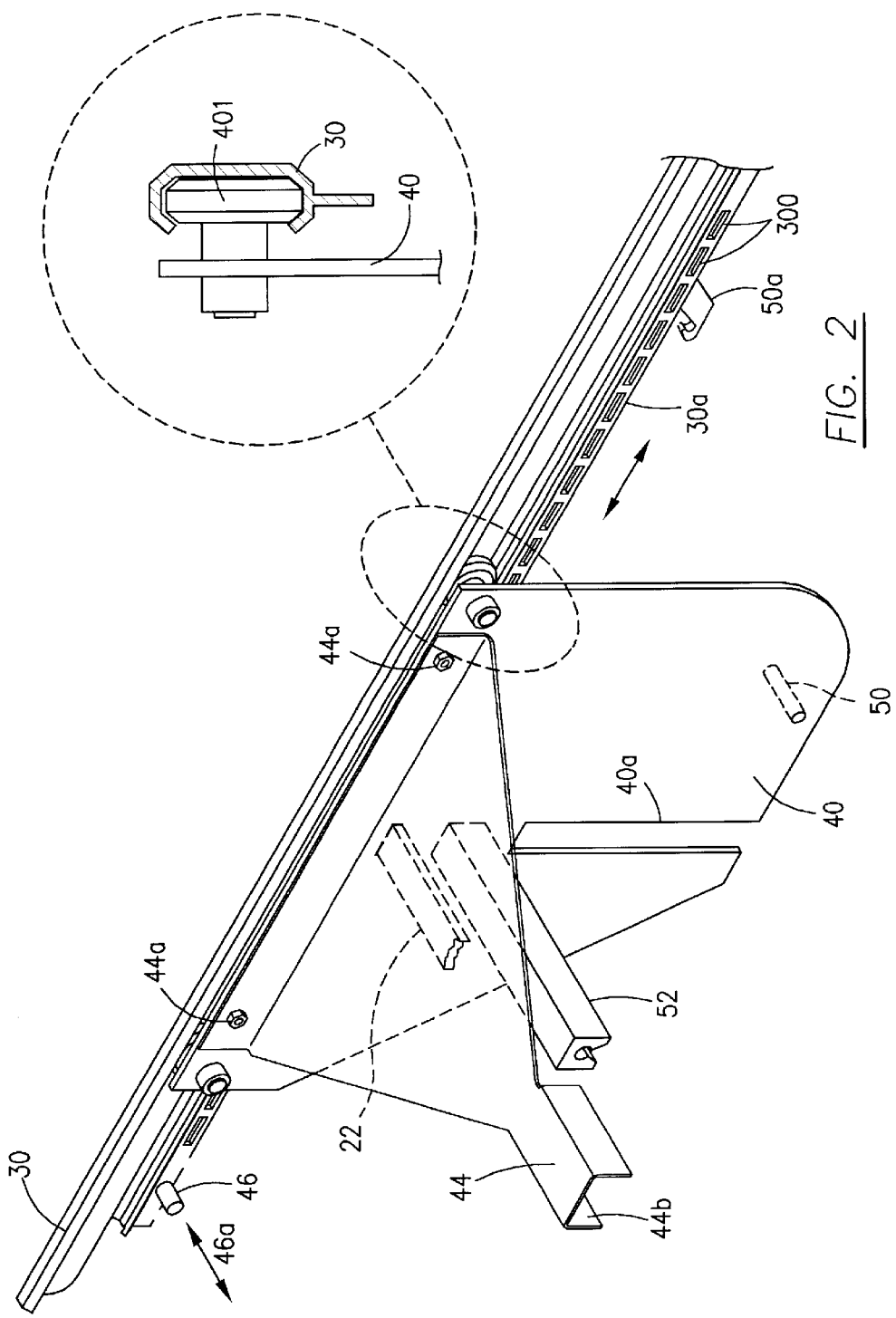
FIG. 2 is a perspective view, partially cut away, of the first side plate engaged with the first track of the invention, with a cross section insert of the track.
Figure 3:
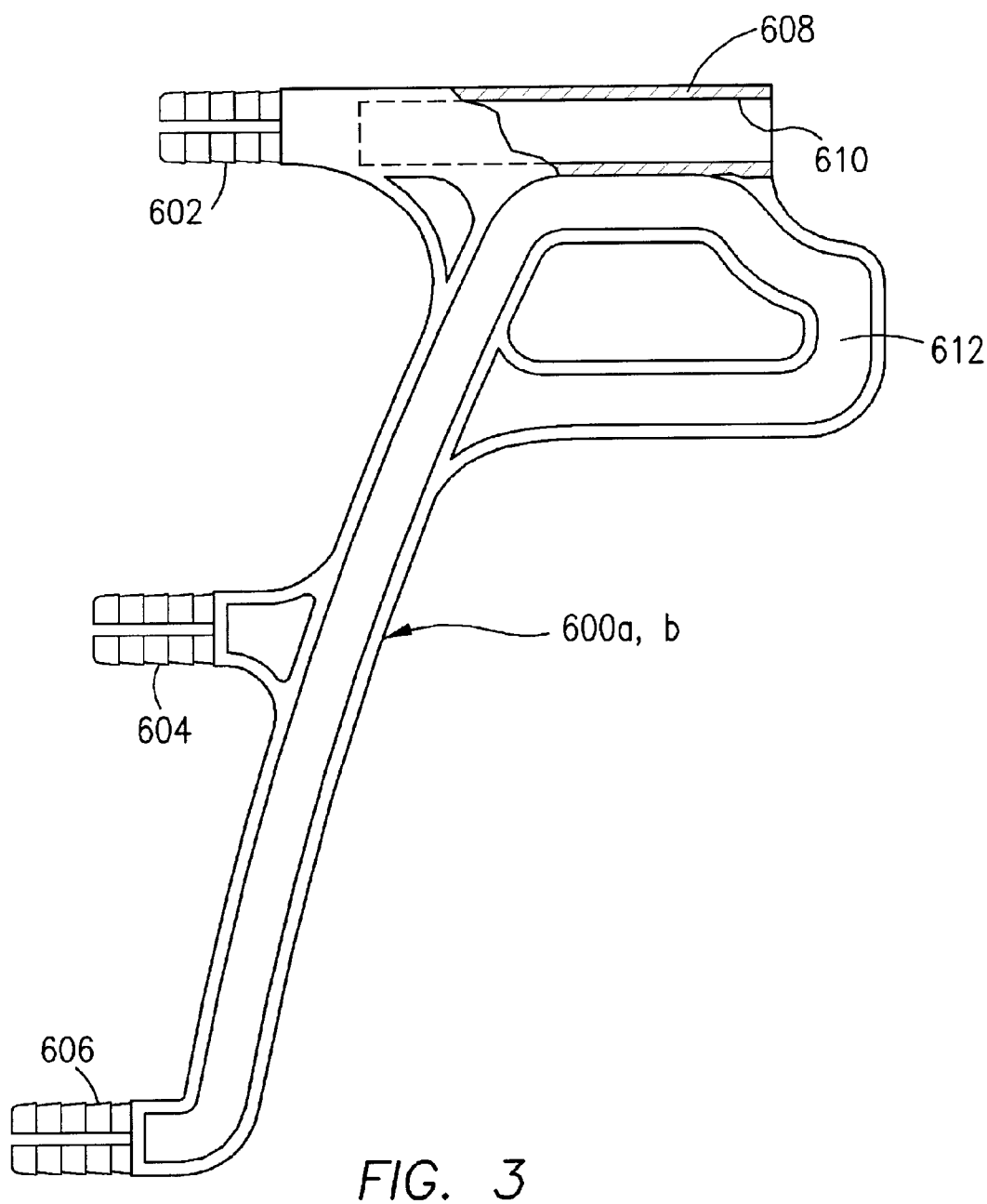
FIG. 3 is a side elevational view, partially cutaway, of one sidearm that is used to form the barrier in accordance with the present invention.

Referring now to FIG. 2, FIG. 3 and FIG. 7, opposing rigid planar first and second wheel carrier side plates 40 and 42 (shown in FIG. 2 without the barrier attached) are used to support the cargo barrier 20. Barrier connecting bars 52 and 54 are attached at one end to each of first and second wheel carrier side plates 40 and 42 so that the bars 52 and 54 are perpendicular to the side plates 40 and 42 as seen in FIGS. 2 and 7. End arm members 600 have openings 610 that slideably receive connecting bars 52 and 54 at the first and second ends 20a and 20b of cargo baffler 20. First side plate 40 is slideably attached to the first end 20a of cargo baffler 20 by bar 52 and second side plate 42 is slideably attached to the second end 20b by the insertion of the corresponding connecting bars 52 and 54 within end arm members 600 of cargo baffler 20 forming the barrier assembly.

The side plates 40 and 42 are telescopically adjustable laterally to allow use of the barrier system with different sized truck beds. First side plate 40 and second side plate 42 are attached to cargo barrier 20 so that first and second side plates 40 and 42 are perpendicular to the cargo barrier 20. The connecting bars 52 and 54 have a rectangular cross section (not circular) to key into the rectangular openings in end arm members 600a and 600b to prevent rotation between cargo barrier 20 and side plates 40 and 42, firmly holding cargo barrier 20 in a vertical position.

A top gusset 44 (FIG. 2) is fixedly attached to the top of first side plate 40 using bolt and nut fasteners 44a. Gusset 44 extends horizontally above and connects slideably to cargo baffler 20 by the engagement of top frame member 24 in rectangular slot 44b. Gusset 44 (mounted only on one side) greatly stabilizes the baffler 20 preventing you movement and racking as the baffler is moved along the wheel tracks. First and second side plates 40 and 42 and gusset 44 are constructed of a strong metal such as an aluminum alloy, though any suitable strong material as wood, metal or reinforced plastic may be used. The rigid wheel carrier side plates 40 and 42, gusset 44, the barrier frame members 24, 26 and 28, the keyed connecting bars 52 and 54 and barrier arms 600a and 600b all work together to provide a sturdy, stable barrier.

Figure 6:
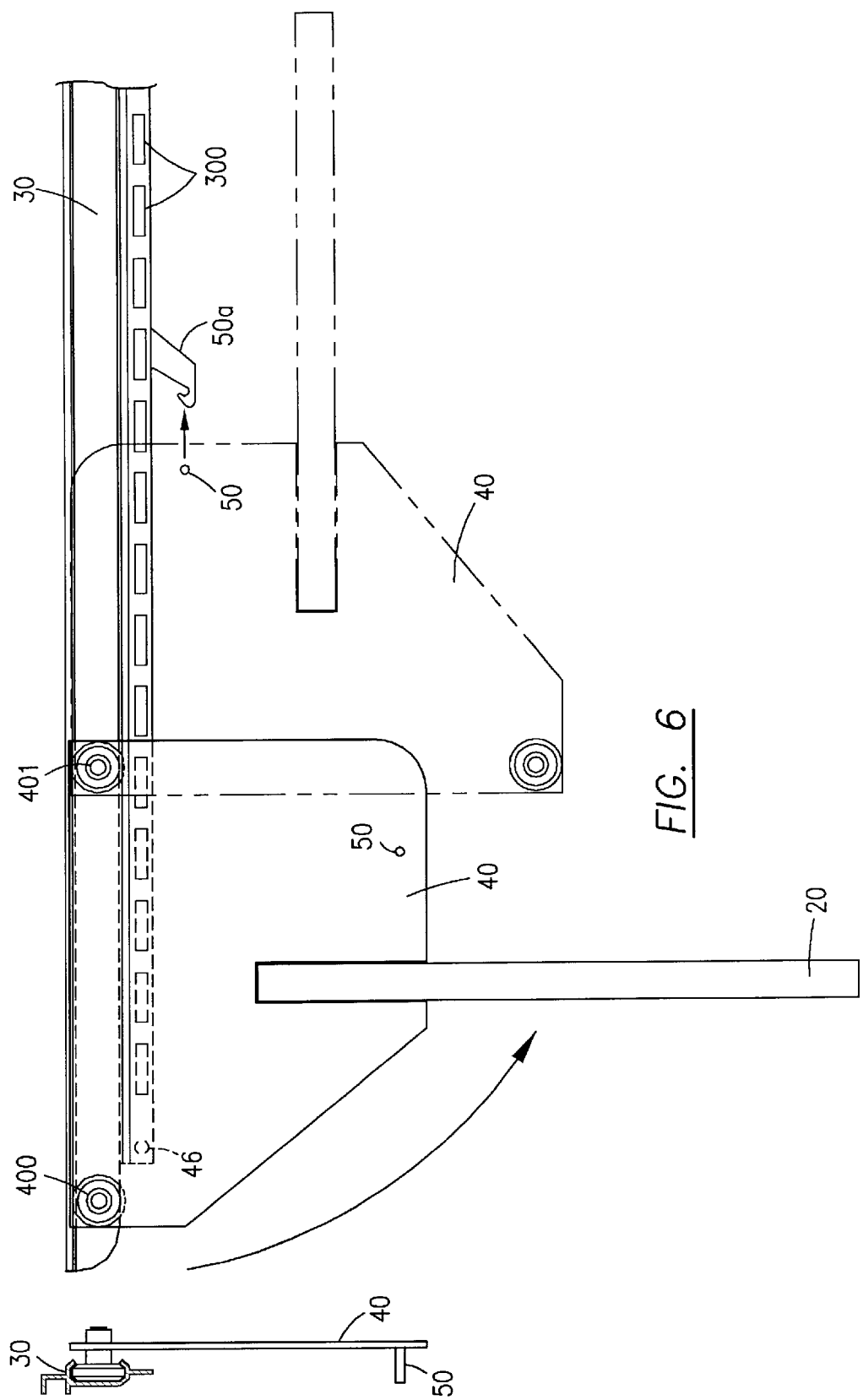
FIG. 6 is a side elevational view of the first track of the invention illustrating the pivot feature of the barrier assembly, showing the barrier in a vertical position and a dotted horizontal position.

Referring to FIGS. 6 and 7, barrier 20 and side plates 40 and 42 are suspended from first track 30 and second track 32 by wheels 400, 401, 402 and 403 as illustrated in FIG. 1. Wheels 400 and 401 are rotationally attached to the upper outside area of first side plate 40 by bolts. Wheels 402 and 403 are attached to the upper outside area of second side plate 42 by bolts. Wheels 400 and 401 engage first track 30 such that first side plate 40 is supported by and can slide along first track 30 (FIG. 2). Similarly wheels 402 and 403 engage second track 32 such that second side plate 42 is supported by and can slide along second track 32. The top areas of both first and second side plates 40 and 42 are purposely elongated to provide maximum wheel separation between the pair of wheels (400,401 and 402,403) on each side plate 40 and 42. Because the barrier 20 is vertically mounted centrally between the front and back wheels on each side plate, each wheel is spaced sufficiently from the center of rotational moment of force if the barrier is forced to pivot, greatly resisting such pivotal force. The greater the wheel separation, the greater the resisting force movement.

Referring now to FIG. 2, first and second tracks 30 and 32 are shaped in cross section like a "C" so that wheels 400, 401, 402, and 403 are prevented from disengaging first and second tracks 30 and 32. First and second side plates 40 and 42 are extended vertically from the top such that a rectangular slot is formed within each plate 40 and 42 which rigidly captures and holds cargo baffler 20 in place vertically. Barrier 20 is manually slidable by releasing the engaging lock relative to the front or back of the truck bed along first and second tracks 30 and 32. Baffler 20 is prevented from sliding beyond the ends of first and second tracks 30 and 32 by releasable pins 46 located at the ends of first and second tracks 30 and 32 as seen in FIGS. 1 and 2. Releasable pins 46 prevent wheels 400, 401, 402 and 403 from traveling beyond the ends of first and second tracks 30 and 32. Releasable pins 46 may be manually manipulated by pressing in the direction of arrow 46a allowing wheels 400, 401, 402 and 403 and the barrier 20 to be removed from the tracks.

Referring to FIG. 1, first track 30 and second track 32 have downward longitudinal flange plates 30a and 32a respectively which extend from the track bottoms. Each flange plate 30a and 32a has a plurality of spaced apart apertures 300 (see FIG. 2), laterally juxtaposed below each track. The flange plate apertures 300 receive lock bar ends to lock the barrier at a fixed longitudinal position. Spring-loaded manually moveable lock bars 21 and 22 project outwardly from each end of the cargo barrier 20 and extend through holes in side plates 40 and 42 respectively. Lock bars 21 and 22 extend laterally within the top cargo barrier frame member 24 along a single axis. The end of each lock bar 21 and 22 can be inserted into the flange plate aperture 300 on each side of the truck bed and on each side of the barrier to lock the barrier in place by manipulating of the actuator tabs 220 and 240 shown in FIG. 1 by standing conveniently on one side of the truck bed.

FIG. 4 shows the lock bar manual actuator having two finger engaging tabs 220 and 240 connected moveably to a spring mount rod 28a which is held by two spring retaining clips 22a, 24a attached to the ends of spring mount rod 28a. Spring mount rod 28a retains spring 28b between tabs 220 and 240. The lock bar actuator shown in FIG. 4 includes finger engaging tabs 220 and 240 that are squeezed together against spring tension from spring 28b that allows both lock bars to move inwardly, disengaging lock bars 21 and 22 free ends from the track apertures 300 permitting manual movement of the barrier divider longitudinally along the wheel tracks. Releasing tabs 220 and 240 allow spring 28b, to expand, extending the free ends of lock bars 21 and 22 into engagement with the track flange and a specific pair of track apertures 300, locking the barrier firmly in place. Tabs 220 and 240 regulate the travel of lock bars 21 and 22 so that they properly engage opposing receiving apertures 20c and 20d located along flanges 30a and 32a when fully extended due to the bias of spring 28b.

Referring back to FIG. 1, the present invention is shown with a cargo item 500 such as a small cylindrical drum that can be secured by a bungee cord or elastic cord 262 by a pair of hooks that are secured or tied to the bungee or elastic cord 262 and which engage tie-off brackets 260 that are slideably attached to the middle frame member 26 so that the tie-off brackets may slide laterally. Tie-off brackets 260 are used to allow a flexible or regular cord or line to be attached to the bracket 260 so that a cargo item such as drum 500 can be secured tightly against the barrier 20, thus securing cargo not only longitudinally with the barrier 20 but laterally. Each adjustable tie-off bracket 260 has a cross section that is C-shaped and engages the lipped area extending along the middle frame member 26 exterior for manual lateral movement as seen in FIG. 5. Although there are two tie-off brackets 260 shown, there could be additional brackets 260 for securing multiple or larger objects. In an alternative embodiment, additional tie-off brackets could also be added to the top frame member 24 if desired. FIG. 5 shows the bracket 260 which includes an aperture 261 that receives a hook, line, rope or plastic cord mounted on a lipped portion of middle frame 26. Note that tie-off brackets 260 can be slideably mounted on both sides of middle frame member 26.

Referring now to FIG. 3, barrier sidearm 600b is shown. The barrier is assembled by having sidearms 600a and 600b on each end. Sidearms 600a and 600b each include stem 602 that is rectangular in cross section that fits into the open rectangular end of the top beam 24 while stem 604 fits into the middle beam 26 and the bottom stem 606 fits into the bottom frame member 28. Thus sidearms 600a and 600b connect together the top, middle and bottom frames forming cargo barrier 20 (the center panels are separate pieces). The sidearm has many important functions and includes a projecting frame portion 612 that fits into a rectangular recess 40a (FIG. 6) within each side plate 40 and 42 (sideplate 40 is shown in FIG. 6) that prevents movement of the barrier 20 relative to side plates 40 and 42. There is a snug fit between the outside portions of 612 and each side plate because of the side plate recess 40a.

Another important feature of sidearms 600a and 600b is that they have rectangular hollow openings 610 in the upper portion just below area 608 that telescopically receive connecting bars 52 and 54 respectively which extend from side plates 40 and 42. Side plates 40 and 42 are slidably attached to sidearms 600a and 600b by insertion of connecting bars 52 and 54 within openings 610 of sidearms 600a and 600b. Sidearm openings 610 are rectangular in cross section, preventing rotation relative to the sidearm opening 610.

Another function of sidearms 600a and 600b is that along and above the top section 608 is a lateral, cross member cap that fits on top of top frame member 24 that houses the lock bars and the lock bar actuator mechanism which fits above sidearms 600a and 600b. Thus sidearms 600a and 600b each provides an important structural member of the invention.

Referring now to FIG. 6, if the cargo item is sufficiently long to require full longitudinal access to the cargo bed such that the vertical barrier is in the way, the barrier can be moved to a horizontal position. In order to move the vertical barrier 20 from vertical operating position to a horizontal storage position, the user moves the barrier 20 to the farthest back position near the end of the truck bed gate at the ends of the wheel tracks. One side plate wheel on each side is removed from each track completely after pushing pins 46 out of the way. In its normal extended position in the wheel track, pin 46 prevents the wheels from leaving the tracks. (To remove the barrier from the wheel tracks, pins 46 are manually depressed and moved out of the track ends) The barrier 20 is manually rotated to a horizontal position about the wheel axes of the two opposing wheels still in the track. Stud 50 is positioned into catch hook 50a on each side of the truck bed. The barrier is now securely mounted horizontally away from the truck bed floor. The barrier cannot interfere with long items placed on the truck bed floor. Pivot studs 50 and pivot catch hooks 50a may be made of aluminum, steel or other suitable rigid material. First and second side plates 40 and 42 may vary in shape to allow the location of opposing pivot studs 50 to be positioned so that the desired pivot position of the cargo barrier 20 as maintained by opposing catch hooks 50a may be obtained.

FIG. 8 shows a universal clamp assembly for a truck bed side wall to connect wheel tracks to the truck bed side wall. A first wheel track 30 and second wheel track 32 are fastened by bolts or clamps to the truck bed side walls so that the wheel tracks are parallel to one another. First wheel track 30 is longitudinally affixed to the top of the first side wall of the truck bed, and second wheel track 32 is longitudinally affixed to the top of the second side wall of the truck bed in one embodiment using several clamp assemblies 60 as seen in FIG. 8. Attachment flanges 30b and 32b extend from first track 30 and second track 32 respectively. Attachment flanges 30b and 32b engage and attach to several clamp assemblies 60. Referring to FIG. 8, each clamp assembly 60 is formed by track clamp member 62 and bed clamp member 64. Track clamp member 62 receives bed clamp member 64 within a bolt channel forming a "C" shaped clamp. Bolt 66 passes through an aperture in track clamp member 62 and is engaged by a threaded aperture within bed clamp member 64. Clamp assembly 60 is assembled around the bed rail 11b of a truck bed. As bolt 66 is tightened, the distance between track clamp member 62 and bed clamp member 64 is reduced so that clamp assembly 60 positively engages the bed rail 11b. A rubber mounting pad 62a is provided along the surface of track clamp member 62 which contacts the bed rail so that the bed rail finish is not damaged. Similarly, a rubber compression pad 64a is provided along the edge of bed clamp member 64 that contacts the bed rail. Second track 32 is adjustably attached to clamp assemblies 60 by bolt 68. Attachment flanges 30b and 32b provide elongated holes that allow bolt 68 to pass through and secure first or second tracks 30 and 32 with clamp assemblies 60. Parallel alignment of first and second tracks 30 and 32 is possible in trapezoidal truck beds by the elongated holes provided in flanges 30b and 32b which allow the installer to specify the attachment point of flanges 30b and 32b with clamp assembly 60. The universal clamp system fits most truck bed rails. Some truck beds have original tonneau covers that include clamping systems that can be fitted with the present invention's wheel tracks.

In a different embodiment, first and second tracks 30 and 32 may also be attached as an accessory to a retractable truck bed cover sold by Roll-N-Lock Corporation by bolts secured to specially provided mounting holes. The track is described in U.S. Pat. No. 5,251,950 owned by Roll-N-Lock Corporation, hereby incorporated by reference.

FIG. 9 shows the invention vertically mounted in its operating position in a conventional truck bed having a bed floor 11 and truck bed walls 11a and 11b. Tracks 30 and 32 are connected appropriately to the truckbed side walls as discussed above. The position of the barrier 20 can be adjusted along the longitudinal length of the truck bed by squeezing the barrier actuator and manually pulling or pushing the barrier along the rails 30 and 32 while continually engaging the finger tabs until the desired location is reached at which time the finger tabs are released allowing the lock bars to engage in opposing apertures within the wheel track flange. The lock bars are then spring-loaded in place once released, once the finger tabs have been released under the spring tension as described above.

The instant invention has been shown and described herein in what is considered the most practical and preferred embodiment. It is recognized, however, that departures may be made from within the scope of the invention and that obvious modifications can be made by those ordinarily skilled in the art.

What is claimed is:

1. An adjustable cargo stabilizer system for use with a truck bed comprising:

a cargo barrier having a first end and a second end, said cargo barrier, said first end having a first aperture and said second end having a second aperture;

first and second wheel engaging tracks, extending on each side of the truck bed and to opposing lateral sides of said truck bed, said first and second tracks having elongated flanges which extend from the bottoms of said tracks, said elongated flanges having a plurality of substantially opposed lock bar receiving and engaging apertures;

a first wheel-carrier side plate having two spaced apart wheels engaged with said first wheel track;

a second wheel-carrier side plate having two spaced apart wheels engaged with said second wheel track;

means for moveably attaching said first wheel carrier side plate to said barrier first aperture and said second wheel carrier side plate to said barrier second aperture;

first and second lock bars connected laterally to said barrier;

means for extending and retracting ends of said first and second lock bar into and out of said flange apertures along said barrier, whereby said barrier is moveable and lockable in numerous different positions along said truck bed.

2. A system as in claim 1, including:

said first and second wheel carrier plates are slideably connected to said barrier for adjusting to different sized truck bed widths.

3. The apparatus system of claim 2 wherein said means for extending and retracting said lock bars includes spring loaded lock rods that project outward from said first and second ends of said cargo barrier and engage said corresponding opposing receiving apertures located along said first and second track flanges.

4. The system of claim 1, including: at least one tie-off fastener bracket slideably attached to said cargo barrier, said sliding tie-off brackets having a flange with a hole for a fastener.

5. The system as in claim 1, wherein said two wheels on each of said first and second wheel carrier plates are rotatably connected to each of said plates and spaced apart by a predetermined linear distance to enhance barrier stability.

* * * * *